(12) United States Patent
Alanezi (10) Patent No.: US 8,147,249 B2
(45) Date of Patent: Apr. 3, 2012

(54) DISPLAY MECHANISM ILLUSTRATING FLUID DYNAMICS

(76) Inventor: Neda Alanezi, Alzahra (KW)

(*) Notice: Subject to any disclaimer, the term of this patent is extended or adjusted under 35 U.S.C. 154(b) by 188 days.

(21) Appl. No.: 12/783,629

(22) Filed: May 20, 2010

(65) Prior Publication Data

US 2011/0287399 A1    Nov. 24, 2011

(51) Int. Cl.
*G09B 25/00* (2006.01)
(52) U.S. Cl. .......................... 434/126; 434/300
(58) Field of Classification Search .............. 434/126, 434/276, 300, 302, 365, 389; 416/112, 117; 446/176, 217
See application file for complete search history.

(56) References Cited

U.S. PATENT DOCUMENTS

| | | |
|---|---|---|
| 1,382,735 A | 6/1921 | McAulay |
| 1,820,652 A | 8/1931 | Eberhardt |
| 3,253,354 A * | 5/1966 | Gollner et al. ............... 434/300 |
| 3,425,152 A * | 2/1969 | Foulkes ........................ 446/166 |
| 3,995,170 A | 11/1976 | Graybill |
| 4,095,422 A | 6/1978 | Kurakake |
| 4,385,497 A * | 5/1983 | Scott .............................. 60/639 |
| 4,398,095 A | 8/1983 | Ono |
| 5,049,080 A * | 9/1991 | Kriebel et al. ............... 434/300 |
| 5,281,856 A | 1/1994 | Kenderi |
| 5,354,203 A * | 10/1994 | Kotch et al. .................. 434/126 |
| 5,372,474 A * | 12/1994 | Miller .............................. 415/1 |
| 5,372,508 A * | 12/1994 | Hautzenroder .............. 434/126 |
| 5,385,472 A * | 1/1995 | Mullin ......................... 434/126 |
| 6,534,881 B1 | 3/2003 | Slavchev |
| 6,561,810 B1 * | 5/2003 | Schellhardt et al. ......... 434/126 |
| 6,607,418 B2 * | 8/2003 | Henry ............................ 446/70 |
| 6,764,275 B1 * | 7/2004 | Carr ................................ 415/1 |

* cited by examiner

*Primary Examiner* — Kurt Fernstrom
(74) *Attorney, Agent, or Firm* — Lowe Hauptman Ham & Berner, LLP (57) ABSTRACT

A display mechanism for illustrating fluid dynamics includes a water basin having a base and a mass of water with a water surface within the basin. A waterwheel is supported within the basin. The waterwheel includes a plurality of pump tools equally spaced about the waterwheel and adapted to fill with water on one side of the waterwheel and to open on the other side of the waterwheel. Each of the pump tools includes three upwardly extending inner pipes. The plurality of pump tools are arranged to contact two outer pipes and are adapted to fill with water on one side of the water wheel.

11 Claims, 8 Drawing Sheets

DISPLAY MECHANISM ILLUSTRATING FLUID DYNAMICS

FIELD OF THE INVENTION

This invention relates to a display mechanism for illustrating fluid dynamics and more particularly to a display mechanism including a waterwheel disposed in a fluid basin for illustrating fluid dynamics.

BACKGROUND FOR THE INVENTION

Waterwheels are well known and have been used to generate power as for example as disclosed in a U.S. Pat. No. 4,001,596 of Kurtzbein. The Kurtzbein patent discloses a pair of hull portions connected in spaced parallel relation to support a waterwheel and forms a passageway therebetween for driving engagement of flowing water against the vanes of the waterwheel. The waterwheel is made up of a pair of wheel portions having peripheral gear teeth, and these teeth are engageable with gears which drive electric generators. The vanes of the waterwheel are adjustable to vary the driving power thereof and have nozzles thereon arranged to discharge water under pressure to provide a boost for the wheel. A brake is provided to control rotation of the waterwheel, and an auxiliary engine is provided to drive the waterwheel when necessary. The longitudinal hull portions support a gate mechanism at the inlet end of the water passageway to control the flow of water through such passageway and have air chambers to buoyantly support the device. The device has vertically extendable legs for ground support.

A more recent patent of Mayo, Jr. et al., U.S. Pat. No. 5,440,175 discloses an electric generator assembly driven by a waterwheel wherein the axial length of the waterwheel is substantially greater than the diameter thereof and contains a speed-increasing device for driving a high speed generator. The assembly is supported from a bridge spanning the full axial length of the waterwheel and the width of the stream and the bridge also supports an adjustable chute extending from the dam crest to the waterwheel. The waterwheel has longitudinal buckets designed to develop maximum energy over a wide range of flow of water and also discharge debris. The buckets are vented as necessary to improve filling and discharge and also minimize vibration. The complete bridge assembly is supported adjacent opposite ends by hydraulic cylinder units connected to and adapted to raise the unitary bridge, chute and waterwheel assembly above increased water levels to reduce drag and rotating friction. By providing either a synchronous or induction generator with a rotating rotor and non-rotatable stator of conventional commercial design, electric power leads are brought out through a non-rotating hollow shaft to a local disconnect switch and transformer that is adapted to increase the voltage, as necessary, for transmission. Retention of water in the buckets until each one reaches the lowest point of travel is provided by an adjustable shroud.

A different approach to the use of a waterwheel is disclosed in a U.S. Pat. No. 6,534,881 of Slavchev. As disclosed therein, a waterwheel apparatus is designed to generate power. The waterwheel is set below the surface of a body of water and has air chambers that inflate and deflate. The air chambers within the wheel have air valves. Air is introduced into specific chambers when desired to cause a buoyancy effect and cause a particular area of the wheel to travel in the direction of the water surface. Introducing air at specific angular positions to the air chambers cause the wheel to rotate under water. The energy derived from the motion are connected to pulley and gear mechanisms to supply power.

Notwithstanding the above it is presently believed that there is a need and a potential market for an improved waterwheel mechanism to be used as a display for illustrating fluid dynamics. The display will illustrate the use of the weight of water in a series of units vs. emptying the water in another portion of the waterwheel so that the weight of the water on one side of the wheel causes rotation of the wheel. The water from the weighted buckets is then used to raise the water in an outer pipe to raise the level of the water in one pipe to a supply tank above the surface of the water. That water is subsequently used to drive an electric generator.

BRIEF SUMMARY OF THE INVENTION

In essence a display mechanism in accordance with the present invention is used to illustrate fluid dynamics. The mechanism comprises and/or consists of a water basin having a base and a mass of water with a water surface within a basin above the base. A waterwheel and means for supporting the water wheel are supported within the basin with a majority of the waterwheel below the surface for rotation about a horizontal axis. The waterwheel includes a plurality of pump tools equally spaced around the waterwheel with a majority of the pump tools below the surface of the water. In addition, each of the pump tools include three upwardly extending inner pipe with two of the inner pipes of equal diameter and disposed on opposite sides of a central larger diameter inner pipe and the two upwardly extending inner pipes each include a piston connected together to a pivot assembly in a lower portion of the central inner pipe so that one of the pistons is at or near the top of one of the pipes when the other of the pistons is near the bottom of the other inner pipe.

Each of the pump tools is pivotally fixed to the water wheel and each of the pump tools includes a top motorized control valve and a bottom motorized control valve and means including the motorized control valves for opening the top and bottom valves at the bottom of the waterwheel and for closing the bottom of the motorized control valve at or near the top of the water wheel so that the pump tools are filled with water to thereby cause the waterwheel to rotate due to the weight of the water filled pump tools on one side of the waterwheel.

A pair of upwardly extending outer pipes adjacent the waterwheel and extending upwardly at a distance equal to or exceeding the diameter of the water wheel is provided and whereas the radius of one of the upwardly extending outer pipes is at least two times the radius of the other of the upwardly extending outer pipes. An upper water tank and means for sealingly positioning two of the three upwardly extending inner pipes within the pump tool in which said pair of upwardly extending outer pipes adjacent to the waterwheel whereby the weight of the water in one of said upwardly extending outer pipes will cause the piston in the upwardly extending inner pipe sealingly fixed thereto to move downwardly and the piston in the other of said upper extending inner pipes to move upwardly to force the water in the upwardly extending inner pipe into the upwardly extending outer pipe with a smaller diameter to a level above the surface of the water in the basin. In addition, means for unsealing and repositioning the upwardly extending inner pipe away from the upwardly extending outer pipe and for opening the motor control valves in said pump tool so that said pump tool with open control valves raises upwardly as the water wheel rotates.

The invention will now be described in connection with the accompanying drawings wherein like reference numerals have been used to indicate like parts.

DESCRIPTION OF THE PREFERRED EMBODIMENTS OF THE INVENTION

The basic idea contemplates a method to push a mass of water up into a tank above a basin as for example, near a river or the sea while consuming a minimal amount of power. From this tank one can use the water to fall down into a turbine similar to a turbine in a dam to generate electrical power.

Figure 1:
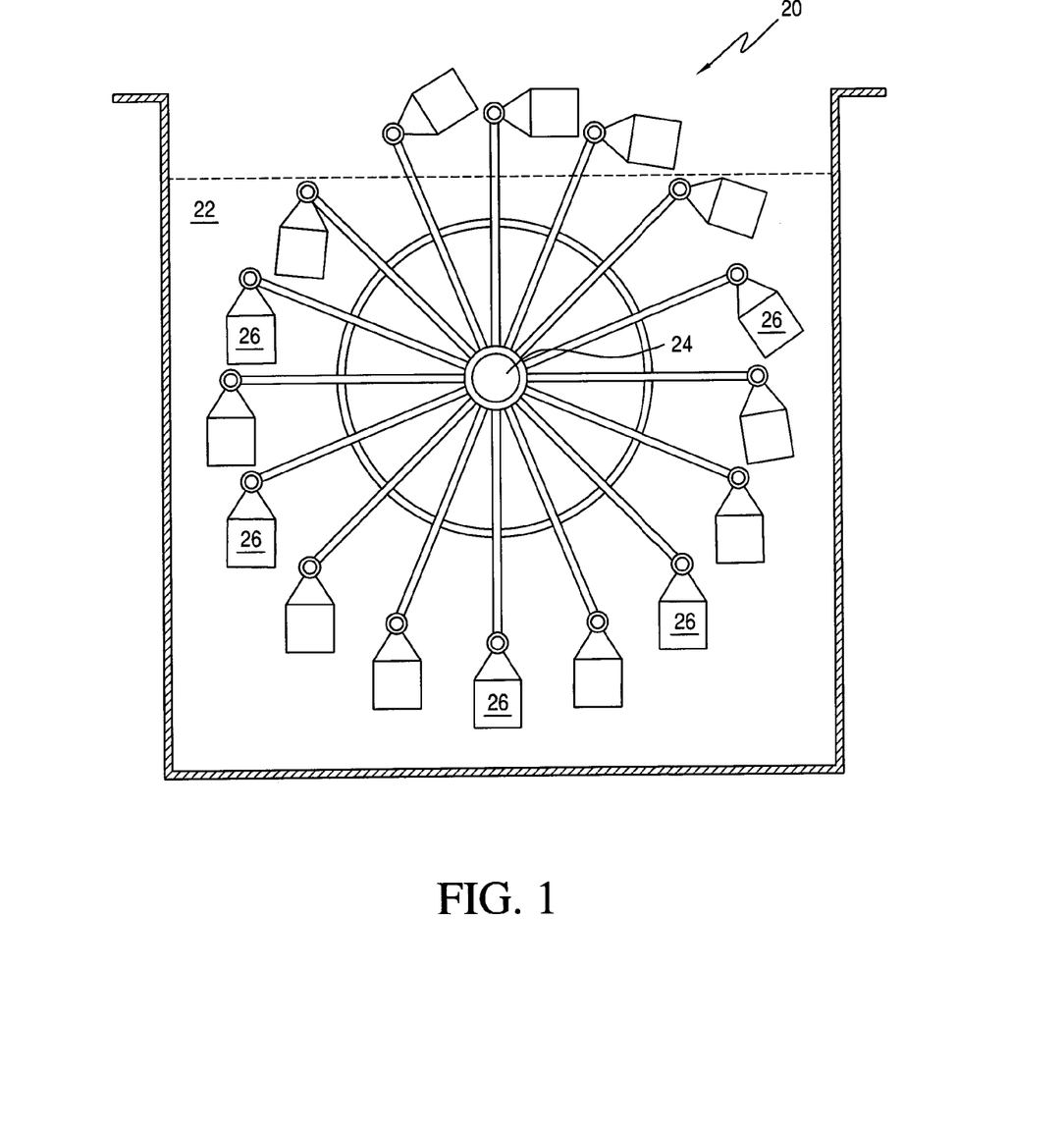
FIG. 1 is a schematic illustration of a water wheel wherein the top of the water wheel is at or near the surface of the water and a bottom of the water wheel is slightly elevated above the bottom of the basin and sixteen pump tools fixed on the wheel.
Figure 2:
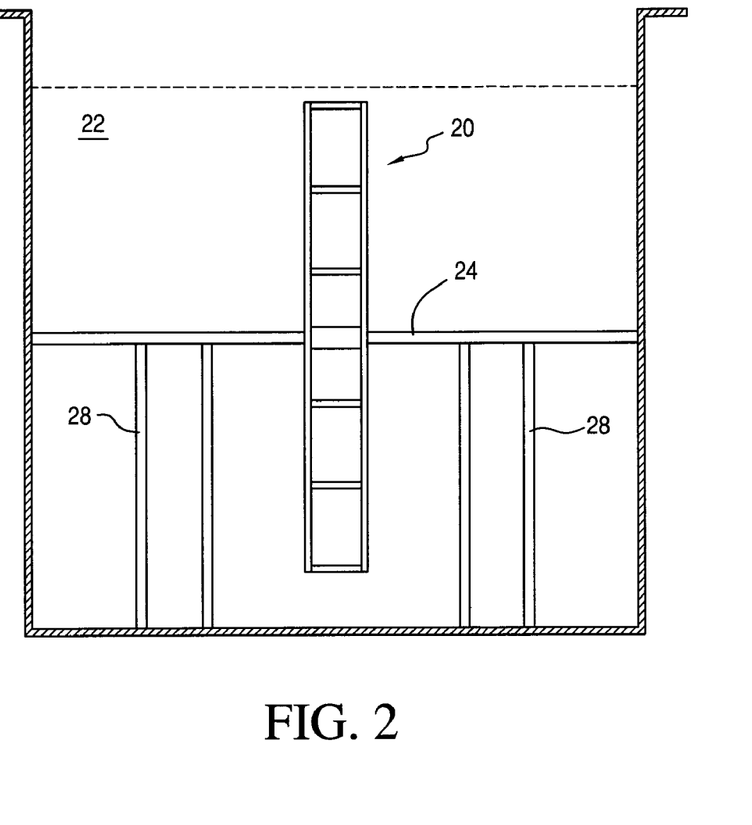
FIG. 2 is a schematic illustration of the water wheel and a pair of supports disposed in a water basin for rotation about a horizontal axis.

As illustrated in FIGS. 1 and 2, a relatively large water wheel 20 is disposed in a basin 22 that is filled with water. The water wheel 20 is constructed and dimensioned to rotate about a central hub 24 or horizontal axis disposed below the surface of the water with a majority of the wheel 20 below the water surface. The water wheel 20 also includes sixteen pump tools 26 fixed thereto. As shown in FIG. 1, the central hub 24 is supported by a pair of supports 28 with the bottom of the wheel 20 near but above the bottom of the basin 22. The number of pump tools may vary depending on the size of the wheel and the depth of the basin 22. As shown in FIG. 1 a majority of the pump tools 26 remain below the surface of the water.

Each of the pump tools 26 (see FIG. 4) includes three upwardly extending pipes namely a central pipe 30 and two outer pipes 29 and 31 of equal diameter and wherein the diameter of the central pipe is about two times the diameter of each of the outer pipes.

Figure 4:
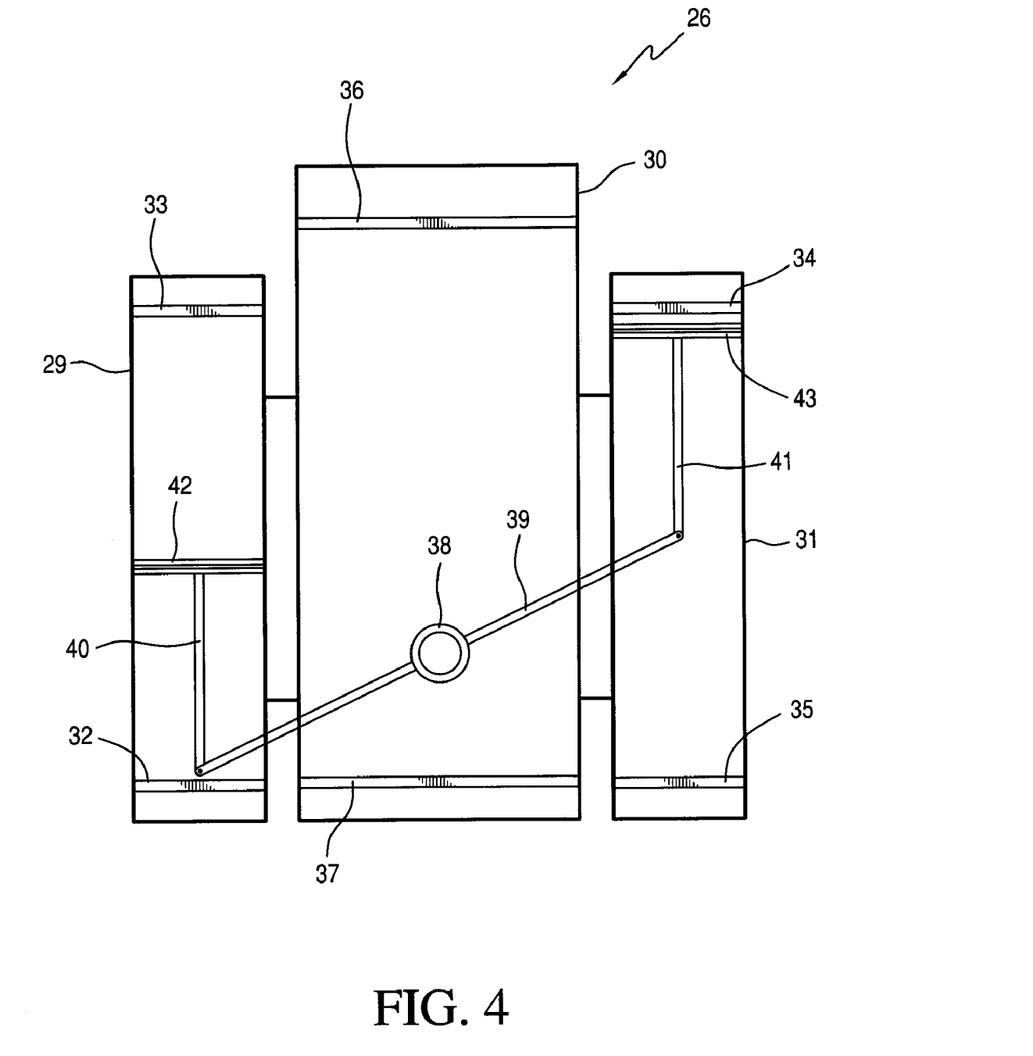
FIG. 4 is a schematic illustration of one of the pump tools as used in the present invention.

The outer pipe 29 is joined to the central pipe 30 by any suitable or conventional means and includes a top motorized butterfly valve 33 and a bottom motorized butterfly valve 32 while the pipe 31 is also disposed on an opposite side of the central pipe 30 and includes an upper motorized butterfly valve 34 and lower motorized butterfly valve 35. The central pipe 30 also includes an upper motorized butter fly valve 36 and lower butterfly valve 37. The central pipe 30 also includes a pivot assembly 38 and a lower portion thereof that includes a pivot arm 39 that is connected at opposite ends thereof to connecting rods 40 and 41 that are connected to pistons 42 and 43 in pipes 29 and 31. The piston has three motorized valves 12. These motorized valves open and close at the same time.

Figure 5:
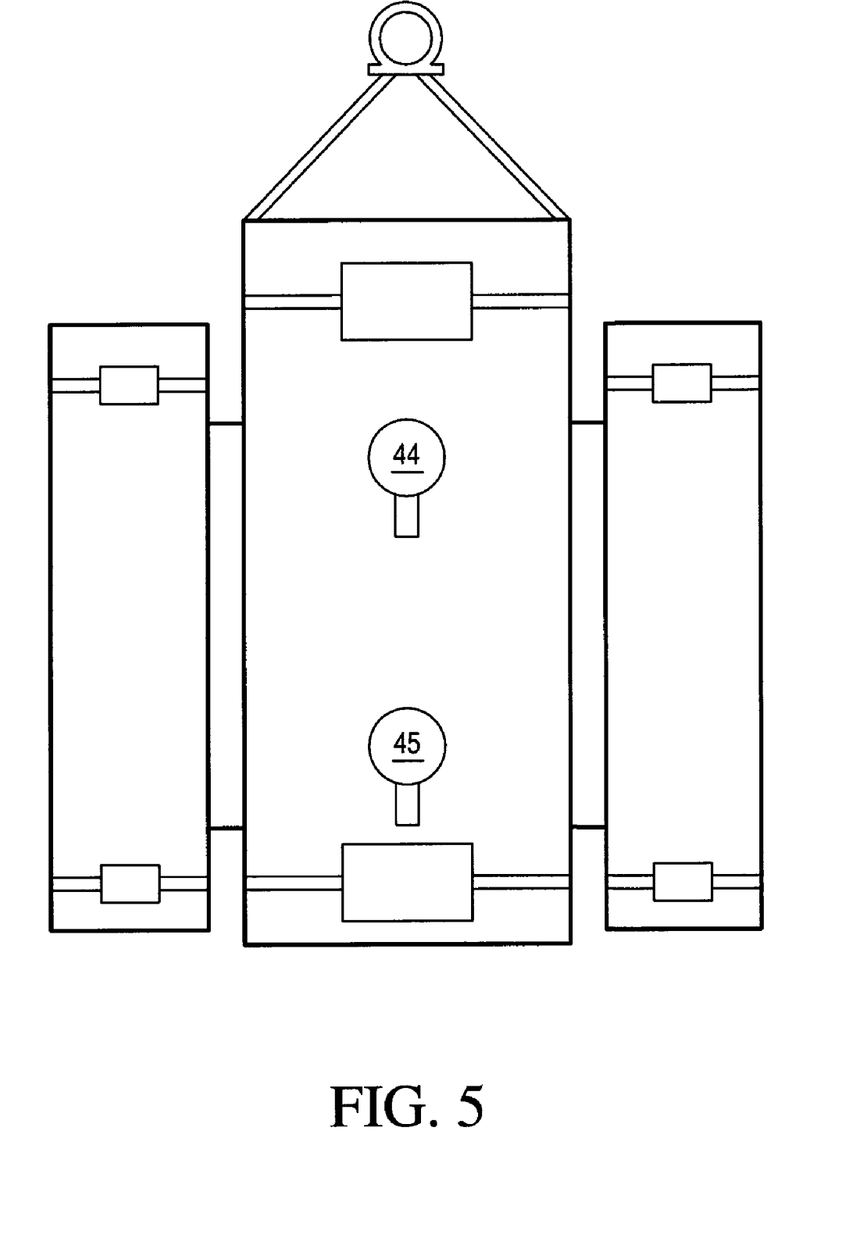
FIG. 5 is a schematic illustration of a pump tool with motorized control valves, as well as outer pipes with motorized control valves.

A motorized butterfly valve as described above is shown in FIG. 3 and the use of the valves will now be described in connection with FIGS. 5, 6 7, and 8. As shown in FIG. 5, the pump tool 26 is at or near the top of the water wheel 20 with the upper motorized valve 33 and 36 at or near the top of the pipes 29 and 30. The motorized valves 33 and 36 are open and the lower valves 32, 35 and 37 are closed so that pipe 30 is filled with water while pipes 29 and 31 are partially filled with water. Then, the weight of the water in the two pipes will cause the wheel to rotate since the upper and lower valves at the bottom of wheel 20 are open so that on the right side of the wheel 20 the pump tools will move upwardly.

Figure 6:
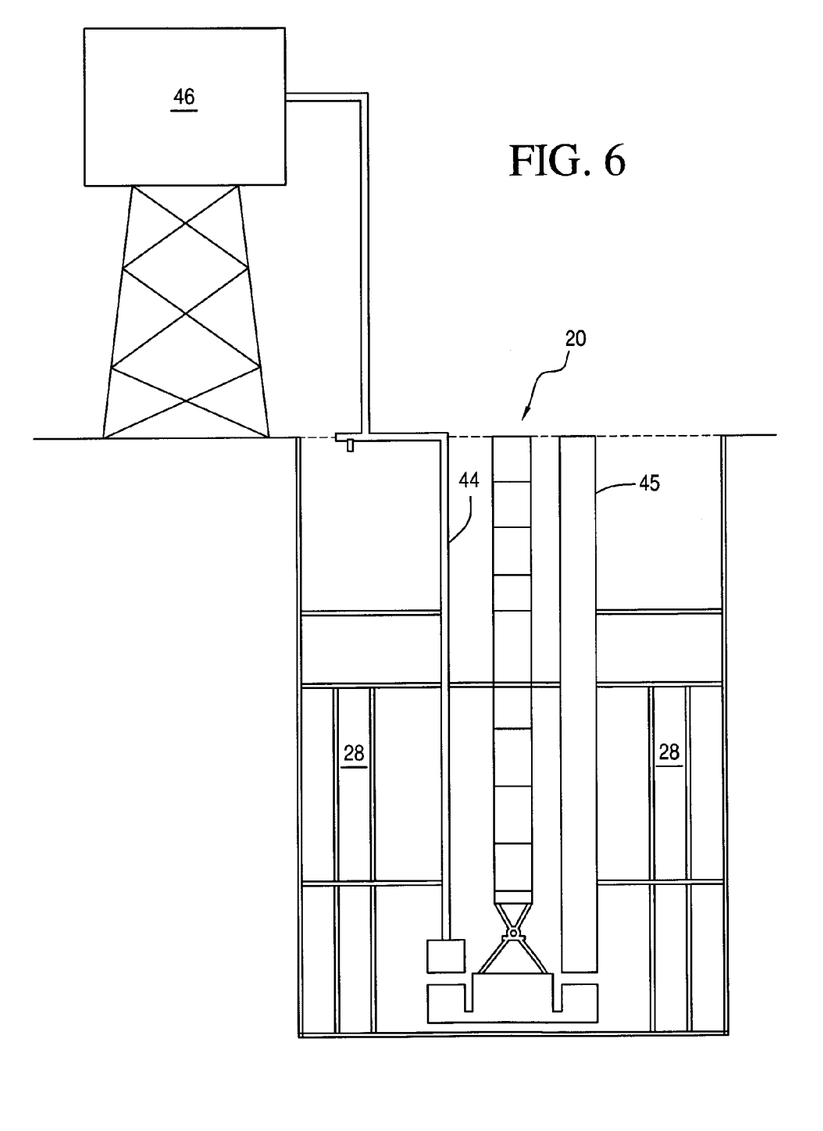
FIG. 6 is a schematic illustration of the water wheel, supports as well as upwardly extending outer pipes that are adjacent to the water wheel and have a length of at least about the diameter of the water wheel.

Referring now to FIG. 6, two pipes 44 and 45 are disposed adjacent to the water wheel 20. As illustrated the pipe 45 has a diameter which is considerably greater than the pipe 44 so that the weight of the water in pipe 45 when connected to pipe 31 pushes piston 43 down to thereby push piston 42 up to the top of pipe 29. This forces a relatively large volume of water up through the thinner pipe 44 and above the surface of the water and into an elevated tank 46.

Figure 7:
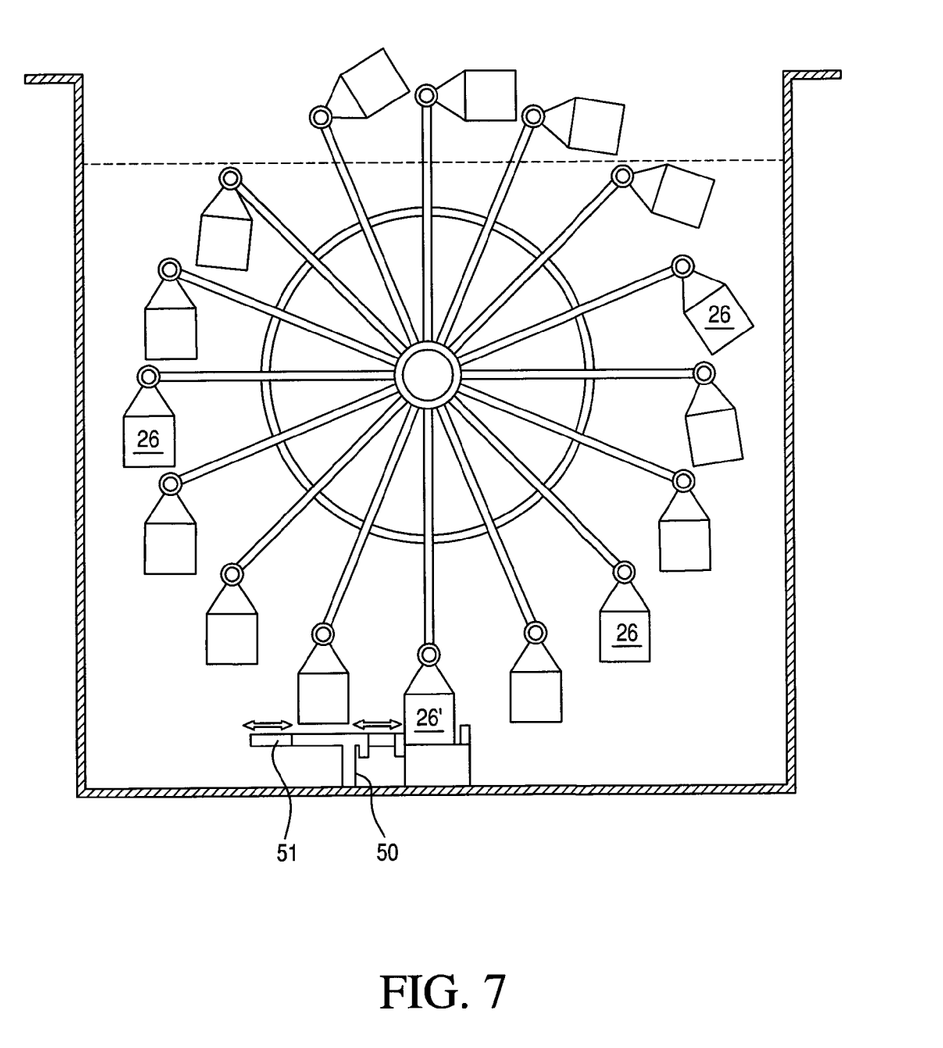
FIG. 7 is a schematic illustration of a mechanism for positioning a pump tool at the bottom of a water wheel.
Figure 8:
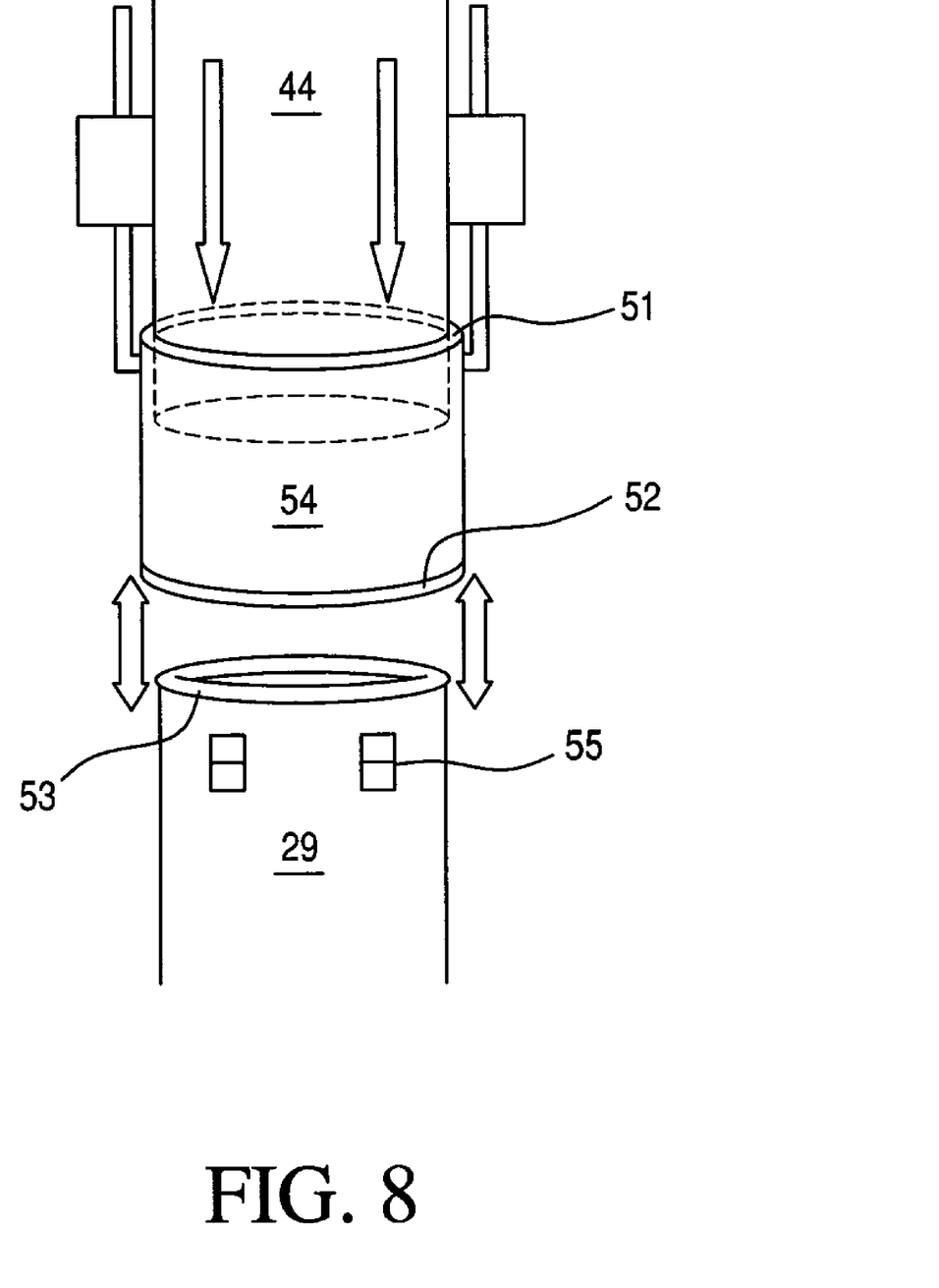
FIG. 8 is a schematic illustration of a mechanism for connecting a pump tool to an outer pipe.

As illustrated in FIGS. 7 and 8 a mechanism 50 is constructed and dimensioned to position the pump tool 26 with upwardly extending pipes 29 and 31 under pipes 44 and 45. The pipe 44 has an adapter portion 51 that has the same diameter as the upwardly extending pipe 29. In other words, a moving barrier will stop and position the pump tool by pushing from behind by a pusher (mechanism 50) to make certain that the pump tool 26' is in the correct place and not moving.

Then when the pump tool comes under the two pipes 44 and 45, a mechanism brings the pipes together and opens the upper valve 34 of pipe 31 while rubber rings 52 and 53 forms a seal between the top of pipe 29 and the bottom of pipe 44. A similar seal is provided between the top of pipe 31 and the bottom of pipe 45 with a connector 54 and means for locking or clamping the pipes together. By opening valve 34 the weight of the water in pipe 45 will push the piston 43 down to thereby raise the piston 42 to force the water in pipe 29 upward into the pipe 44 to raise a quantity of water upwardly above the surface of the water in the basin 22 and into the tank 46. Then, after the water is delivered into the tank 46 the bottom valves of the pipe 44 are closed to prevent the water in pipe 44 from flowing outwardly therefrom.

At this stage all of the valves in the pump tool 26' are open i.e. in pipes 29, 30 and 31, and the lock or clamp is released and the connector 54 removed so that a successive pump tool 26 can be moved into place. Then the pump tool on the right side of the water wheel 20 will have no resistance to move upwardly toward the top of the waterwheel while those on the opposite side of the waterwheel are filled with water and moved downwardly to rotate the wheel.

Figure 9:
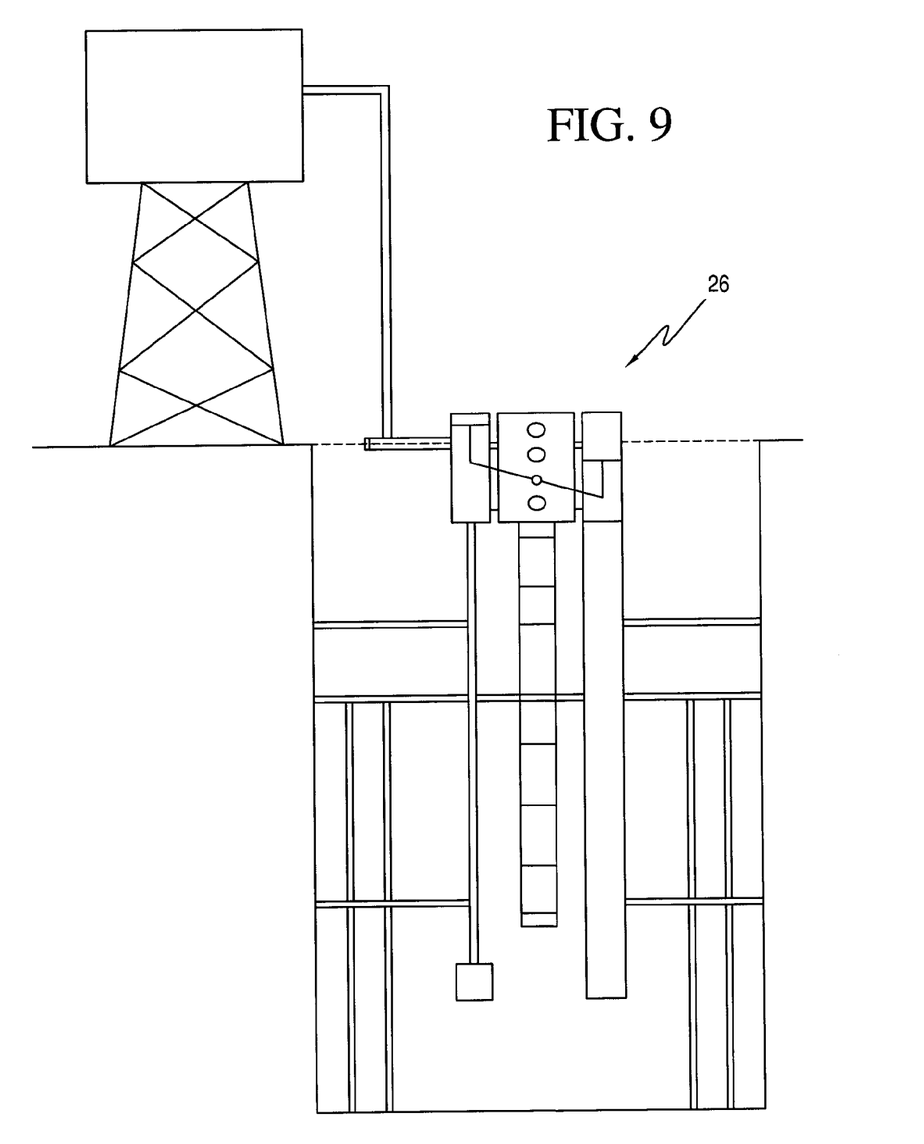
FIG. 9 is a schematic illustration of a display in accordance with a further embodiment of the invention.

A further embodiment of invention is illustrated in FIG. 9 wherein a pump tool 26 is shown at an upper position of the waterwheel 20 for moving the water in pipe 44. In the beginning we assume that all valves of the pump tool are close, then we dip the pump tool in the water and open the two upper motorized valves 33 & 36 at or near the top of the pipes 29 & 30 so that the pipes 29 & 30 will fill with water and create weight in the pump tool to goes down to rotate the wheel clockwise, Also the water filled in the pipe 29 will press the piston 42 in pipe 29 to goes down then we should open the three piston valves 13 in the piston 43 in the pipe 31 (so that if the pipe piston 43 goes up will not have effect from the vacuum resistant because the upper motorize valve 34 of pipe 31 closed and there is a vacuum between the piston 43 and the upper motorize valve 34 of pipe 31) then if the piston 42 of the pipe 29 goes down to thereby raise the piston 43 of pipe 31 to goes up. After we reach this point we close the top motorize valve 33 for the pipe 29 and close the three piston valves 13 of pipe 31. Then we do the same thing to the next pump tool an teal the left side of the wheel have pumps tools fill with water, by filling the pump tool from the top of the wheel and emptying the pump tool from the bottom of the wheel we will have filled pumps tools filling with water in the left side of the wheel and empty pump tool on the right side of the wheel then we will have a movement of the wheel with clock wise. On the bottom of the wheel when the pump tool come under the two upwardly pipes 44 & 45 and jointing between this pipes is completed we open the upper motorize valves 33 & 34 of pipes 29 & 31 and open the bottom valve of pipe 44, So that the piston 43 of the pipe 31 will go down by effect of the weight of the water in pipe 45 comber with the effect of the water weight in pipe 44 which smaller, so that the weight of water in pipe 45 will push the piston 43 down to thereby rise the piston 42 to force the water in pipe 29 upward into pipe 44 to rise quantity of water upwardly above the surface of water in the basin 22 and into the tank 46. Then we close bottom valves of the pipe 44 to prevent the water in pipe 44 from flowing outwardly.

At the end we open all valves of the pump tool (top motorize valves 33 & 34 and 36, Also we open the bottom motorize valves 32 & 35 and 37 for pipes 29 & 30 and 31 also we open the three piston valves 12 & 13 for pipes 29 & 31) and opening the lock between the pipes 45 & 31 and between the pipes 44 & 29 and removing the joint pipe between pipes 44 & 29 and the pipe piece between 45 & 31 and removing the barrier which is stopping the pump tool from moving to be replaced by another pump tool to repeat the same procedure In the present invention a large water wheel 20 as shown in FIGS. 1 and 2 partially submerged in the water basin with the top of the wheel on the surface of the water and the bottom of the wheel up from the bottom of the water. The waterwheel 20 includes a number of pump tools as for example 10, 15 or 20 or any number depending on the design. FIG. 1 shows the wheel from the side with 16 pump tools fixed on this wheel with a majority being below the surface of the water basin. FIG. 2 showing the wheel it self without the pump tool from the front.

Figure 3:
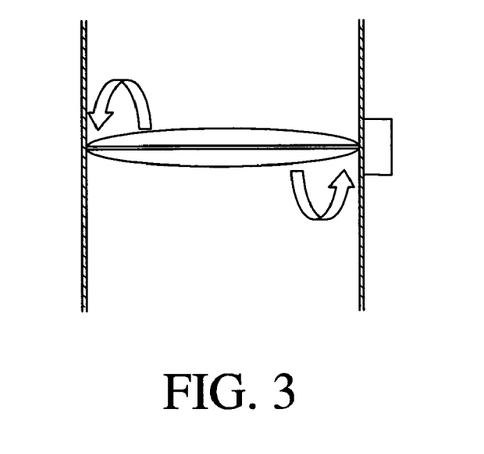
FIG. 3 is a schematic illustration of a motorized butterfly control valve and motor as used in the present invention.

FIG. 3 shows a motorized butterfly valve as used in the present invention while FIG. 4 illustrates a pump tool 26.

The pump tools 26 which are fixed on the circumference of the wheel 20 each consists of three vertical pipes 29, 30 and 31 joined together with pipe 29 and 31 on opposite sides of pipe 30 and fixed to a pivot or hub 38. As shown pipe 30 is bigger than the two pipes 29 and 31 so that it can contain a larger quantity of water. Inside pipe 29 & 31 their is a moving piston that moves up and down through the pipe 30 with an arm under the base or piston, at the end of this arm and is connected to the two pipes 29 and 31. This horizontal arm passes through pipe 30 with a pivot or hub 38 in pipe 30 so that the piston in one pipe goes up while the piston in an opposite pipe goes down. Pipes 29, 30, and 31 each have a motorize controls valve on the top and bottom thereof.

As illustrated in FIGS. 5 and 6, the pump tool 26 includes two upwardly extending vertical pipes 44 and 45 with motorize control valves at the bottom thereof. The pipe 45 is filled with water from the surface of the basin and the bottom valve is closed. Also the motorized bottom control valve in pipe 29 is also closed.

The two vertical pipes 44 and 45 inside the basin are disposed on opposite sides of the wheel 20 and have ratios that are equal to the ratio of pipes 29 and 31. The bottom portion of the pipe 44 includes an adapter 44' that has the same diameter as the pipe 29, but a much smaller diameter above the adapter so that when water from pipe 29 is pushed upwardly into pipe 44 it raises the water above the surface of the water in the basin and into the tank 46. This is done because of the weight of the water in pipe 45. For example, when the pipe 45 is connected to the pipe 31 the weight of the water forces the piston in the upper motorized valve in pipe 31 is opened and the lower valve 45' is also opened so that the weight of the water in pipe 45 pushes the piston 43 downward causing the piston 42 to move upwardly and force the volume of water from pipe 29 into the pipe 44. Therefore, since the diameter of pipe 44 is smaller than the diameter of pipe 45 the amount of water will raise the level of water in pipe 44 up above the surface of water in basin 20 and into the tank 46 as shown in FIG. 6. The ratio of the diameters of pipes 44 and 45 is about 1 to 3. A mechanism 50 stops each pump tool 26 and positions it with respect to the upwardly extending pipes 44 and 45.

A mechanism 50 shown in FIG. 7 is used to position each of the pump tools 26 one by on with respect to the upwardly extending pipes 44 and 45 with the upwardly extending pipes 29 and 31 aligned with the pipes 44 and 45. Then when the lower motorized valve 45' is opened the upper valves 33 and 34 are opened and the weight of the water in pipe 45 will push the piston 43 down in pipe 31 and through a connecting rod 41 cause the lever 39 to rotate about the hub 38 to thereby lift the connecting rod 40 upwardly raising piston 42 to force an equal volume of water upwardly into pipe 44. This is accomplished by opening the valve 33 in pipe 29 and a lower valve in pipe 44. Then since the diameter of pipe 44 is considerably smaller than the diameter in pipe 45 this will raise a volume of water upwardly above the surface and the basin and into the tank 46.

In the operation of the display, assume that all valves of the pump tool 26 are closed except the top valves in the pipes 29 and 30. Then the pump is submerged so that the pipes 30 & 31 fill with water and create weight on the pump tool 26 that go down to rotate the wheel counter clockwise. Also the water that fills the pipe 29 will press the piston in pipe 29 to goes down. Then you open the base valve in the pipe 31. Then if the base or piston in the pipe 29 goes down from weight of water, the piston on pipe 31 will move upward because of its connection to the piston in pipe 29 by the lever arm 39. When this point is reached the valves in pipes 29 and 30 are closed. The top valves in pipes 29 and 30 are closed and after that the same steps are taken with subsequent pump tools. Then when the pump tools 26 on the left side of the wheel 20 are filled with water by filling the pump tools from the top of the wheel 20 and emptying the tools from the bottom of the wheel so that pump tools fill with water on the left side of the wheel and empty pump tools on the right side of the wheel will rotate in a counter-clockwise direction.

The pipes 44 & 45 should have a small joint pipe in the bottom fixed with hydraulic motor moving the joint up and down so when a pump tool 26 is in its place under the pipe 44 & 45 the motor arm pushes the joint to connect the pipes 44 & 45 with pipes 29 & 31. The pipes 29 & 31 & 44 & 45 each have a rubber edge and have a lock to open and close the pump tools to prevent water from leaking and to have the highest efficiency from pumping the highest quantity of water to the tank.

When the pump tool come under the two pipe 44 & 45 and jointing between this pipes 29 and 31 is completed the top valves of pipes 29 & 31 are open and the bottom valve of pipe 44, so that the base of the pipe 31 will go down by effect of the weight of the water in pipe 45 with the effect of the water weight in pipe 44 is much smaller, then the base of pipe 31 is pushed down from the effect of the weight and the base of the pipe 29 pushes up, so that the water from pipe 29 pushes the water up in pipe 44 to the tank 46. After the water goes up to the tank the bottom valve of the pipe 44 are closed to prevent loss of water in pipe 44 and all valves are opened in the pump tool (top piston three valves, top valves 33, 34, and 36 and bottom valves 32, and 37 and opening the lock between the pipes 44 & 29 and between the pipes 45 & 31 and removing the joint pipe between pipes 44 & 29 and the pipe piece between 45 & 31 to the top and removing the barrier which is stopping the pump tool from moving to be replaced by another pump tool to repeat the same procedure.

In the right side of the wheel the pump tools 26 will have no effect from water weight because the valves in the pump tools will be open from the top and bottom so it will not have a resistance from the water to move up.

By this mechanism one can use the water in the tank to fall onto a turbine such as the one used in a dam to generate power or any uses.

The basic concept is to provide a display wherein water is pumped to a higher tank and to use this water to generate power. In other words, the invention is a combination between a waterwheel 20 and pump and two vertical pipes and valves on these pipes and on the pump tools to control the display or by putting more than one wheel 20 with pump tools and collect the water in the same tank by controlling the tank quantity and number of wheels and the turbine inlet water needed to use the falling water to generate power from a turbine.

After the pipes join we open the top valve of pipe 29 & 31 and the bottom valve 44 the water in the pipe 45 will press on the base pipe 29 to go down on the other side the base pipe 31 will go up to push the water inside the pipe up so that the water will flow to the tank as in the FIG. 6

At the end when the pump tool pushes the water up the barriers and the lock between the pipe 45 & 31 and 44 & 29 remove and open all valves in the pump tool to let it go to com another pump tool to repeat the same thing. Then the pump tool goes up and since it will not have the weight of water it will have only its own weight compared with the other one which it fill with water and closed from the bottom or top or both.

While the invention has been described in connection with its preferred embodiments it should be recognized that changes and modifications may be made therein without departing from the scope of the appended claims.

What is claimed is:

1. A display mechanism including a water wheel for illustrating fluid dynamics, said mechanism comprising:
    a water basin having a base and a mass of water with a water surface within said basin;
    a water wheel and means supporting said water wheel within said basin with a majority of said water wheel below the surface of water for rotation about a horizontal axis and said water wheel including a plurality of pump tools equally spaced around said water wheel with a majority of said pump tools below the surface of said water;
    each of said pump tools including three upwardly extending inner pipes with two of said inner pipes of equal diameter and disposed on opposite sides of a central larger diameter central pipe and said two upwardly extending inner pipes each including a piston connected together through a pivot assembly in a lower portion of said central inner pipe so that one of said pistons is at or near the top of said pipe when the other of said pistons is near the bottom of said other inner pipe;
    each of said pump tools pivotally fixed to said water wheel and each of said pump tools including a top motorized control valve and a bottom motorized control valve and three motorized valves surround the piston and means including said motorized control valves for opening said top and bottom valves at the bottom of said water wheel and for closing said bottom of said motorized control valves at or near the top of said water wheel so that the pump tools are filled with water to thereby cause the water wheel to rotate due to the weight on the water filled pump tools on one side of said water wheel;
    a pair of upwardly extending outer pipes adjacent said water wheel and extending upwardly at a distance equal to the diameter of said water wheel and wherein the radius of one of said pair of upwardly extending outer pipes is at least two times the radius of the other of the said upwardly extending outer pipes;
    an upper water tank and means for sealingly positioning two of said three upwardly extending inner pipes within said pump tool with said pair of upwardly extending outer pipes adjacent to said water wheel whereby the weight of said water in said upwardly extending outer pipes will cause the piston in the upwardly extending inner pipe to be sealingly fixed thereto to move downwardly and the piston on the other of said upwardly extending inner pipes to move upwardly to force the water in said upwardly extending inner pipe into the upwardly extending outer pipe with the smaller diameter to a level above the surface of the water in said basin; and
    means for unsealing and repositioning said upwardly extending inner pipes away from said upwardly extending outer pipes and for opening said motor control valve in said pump tool so that said pump tool with open control valves moves upwardly as the water wheel rotates.

2. A display mechanism according to claim 1 in which said basin is confined by a transparent structure.

3. A display mechanism according to claim 2 in which the water wheel includes between ten and twenty pump tools that are spaced apart by about 18° and 36°.

4. A display mechanism according to claim 3 which includes sixteen pump tools equally spaced by about 22.5° around said water wheel.

5. A display mechanism according to claim 4 that includes a plurality of water wheels each of which include a plurality of pump tools.

6. A display mechanism including a water wheel for illustrating fluid dynamics, said mechanism consisting of:
    a water basin having a base and a mass of water with a water surface within said basin above said base;
    a water wheel and means supporting said water wheel within said basin with a majority of said water wheel below the surface of water for rotation about a horizontal axis and said water wheel including a plurality of pump tools equally spaced around said water wheel with a majority of said pump tools below the surface of said water;
    each of said pump tools including three upwardly extending inner pipes with two of said inner pipes of equal diameter and disposed on opposite sides of a central larger diameter central pipe and said two upwardly extending inner pipes each including a piston connected together through a pivot assembly in a lower portion of said central inner pipe so that one of said pistons is at or near the top of said pipe when the other of said pistons is near the bottom of said other inner pipe;

each of said pump tools pivotally fixed to said water wheel and each of said pump tools including a top motorized control valve and a bottom motorized control valve and three motorized valves surrounds the piston and means including said motorized control valves for opening said top and bottom valves at the bottom of said water wheel and for closing said bottom of said motorized control valves at or near the top of said water wheel so that the pump tools are filled with water to thereby cause the water wheel to rotate due to the weight on the water filled pump tools on one side of said water wheel;

a pair of upwardly extending outer pipes adjacent said water wheel and extending upwardly at a distance equal to the diameter of said water wheel and wherein the radius of one of said pair of upwardly extending outer pipes is at least two times the radius of the other of the said upwardly extending outer pipes;

an upper water tank and means for sealingly positioning two of said three upwardly extending inner pipes within said pump tool with said pair of upwardly extending outer pipes adjacent to said water wheel whereby the weight of said water in said upwardly extending outer pipes will cause the piston in the upwardly extending inner pipe to be sealingly fixed thereto to move downwardly and the piston on the other of said upwardly extending inner pipes to move upwardly to force the water into upwardly extending inner pipe into the upwardly extending outer pipe with the smaller diameter to a level above the surface of the water in said basin; and means for unsealing and repositioning said upwardly extending inner pipes away from said upwardly extending outer pipes and for opening said motor control valve in said pump tool so that said pump tool with open control valves moves upwardly as the water wheel rotates.

7. A display mechanism according to claim 6 that includes fifteen pump tools equally spaced by about 22.5° around said water wheel.

8. A display mechanism according to claim 7 which includes a model of a generator driven by water from said pump tools.

9. A display mechanism according to claim 8 that includes a mechanism for positioning a pump tool at the bottom of the water wheel.

10. A display mechanism according to claim 9 that includes a mechanism for sealingly connecting an inner pipe to an outer pipe.

11. A display mechanism according to claim 10 that includes means for sealingly clamping said two inner pipes to said two outer pipes.

* * * * *